(No Model.)

J. J. BLACK.
VEHICLE RUNNING GEAR.

No. 474,113. Patented May 3, 1892.

WITNESSES.
Frank Miller.
Albert H. Bates.

INVENTOR.
John J. Black
By his attorney
E. L. Thurston

United States Patent Office.

JOHN J. BLACK, OF CLEVELAND, OHIO.

VEHICLE RUNNING-GEAR.

SPECIFICATION forming part of Letters Patent No. 474,113, dated May 3, 1892.

Application filed September 19, 1890. Serial No. 365,452. (No model.)

*To all whom it may concern:*

Be it known that I, JOHN J. BLACK, a citizen of the United States, residing at Cleveland, in the county of Cuyahoga and State of Ohio, have invented certain new and useful Improvements in Vehicle Running-Gear, of which the following is a full, clear, and exact description, reference being had to the accompany drawings, in which—

Figure 3:
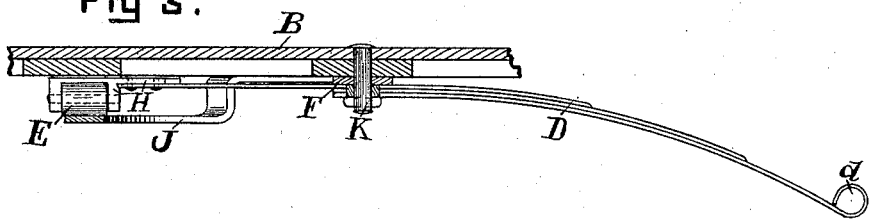
Figure 2:
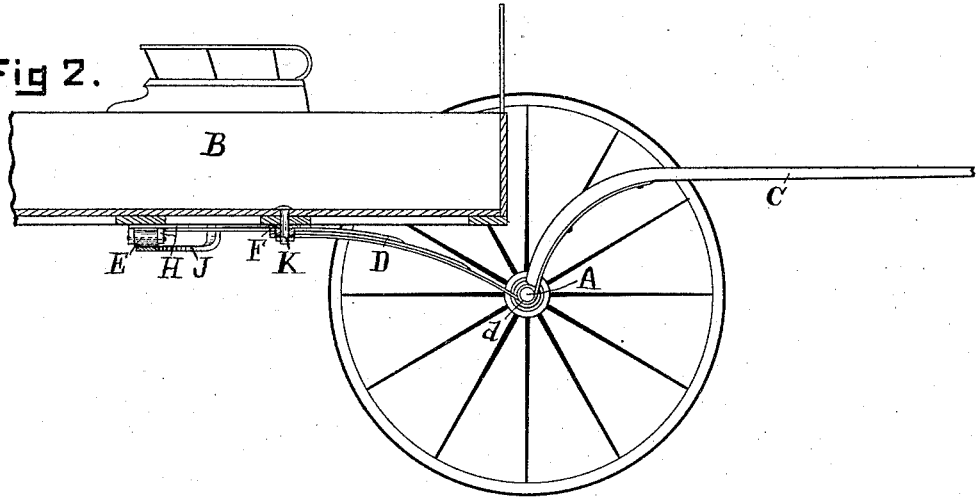
Figure 1:
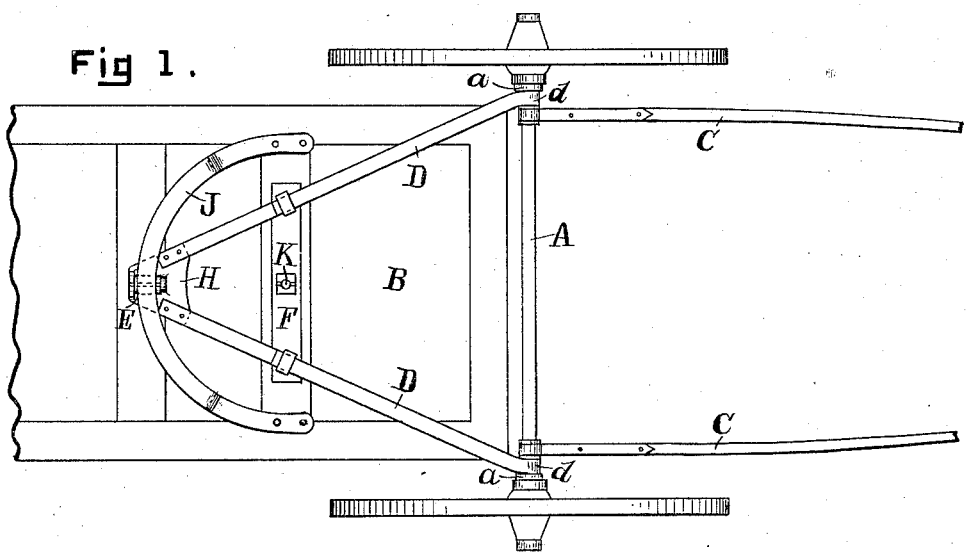

Figure 1 is a plan view of the under side of the forward end of a wagon-body with my invention applied thereto. Fig. 2 is a central vertical section of said wagon, and Fig. 3 is a central vertical sectional view of the fifth-wheel and the springs by which it is connected with the axle.

My invention relates to the forward running-gear for wagons—that is to say, to the fifth-wheel and its connection with the forward axle and wagon-body.

My chief objects are to provide a very cheap smooth-riding construction, consisting of a small number of parts, which may be easily attached to the wagon-body, and which will operate easily and with very little rattling.

To this end it consists in the construction and combination of parts shown in the drawings, hereinafter described, and pointed out definitely in the claims.

Referring to the parts by letter, A represents the front axle, B the wagon-body, and C C the shafts. The shafts are connected to the axle by clips or any other suitable devices which prevent the revolution of the axle relatively to the shafts.

D D represent springs, the forward ends of which are bent to form eyes, and the axle passes through said eyes $d\ d$. The parts of the axle near the wheels, around which the eyes $d\ d$ lie when the parts are properly arranged, are cylindrical. Outside the springs the axle is provided with shoulders $a\ a$, which prevent the springs from coming in contact with the wheels when said springs are spread, as they may be by the weight in the wagon-body.

Several distinct advantages arise from the employment of the cylindrical axle and the eyes in the ends of the springs, which advantages are secured at less expense and with greater completeness than with prior constructions. It is cheaper than a square axle and shackle connections, and it is believed that less motion of the horse is felt in the wagon. Moreover, the rigid attachment of the shafts to the axle and the attachment of the springs thereto in the manner above described prevents, substantially, all of the rattling which usually accompanies the use of a wagon of this general character, in which the axle is secured either to the shafts or the springs by means of shackles, because the weight of the wagon is sustained at the point where the only loose connection is found—viz., between the axle and springs—and the friction caused by said weight effectually prevents rattling. The springs D D converge toward their inner ends, and a cross-bar F, through which the king-bolt K passes, is rigidly secured to said springs by clips or other suitable means. Behind the cross-bar and in rigid connection with the springs is a plate H, in which is mounted a friction-roller E. A segment bar J is secured to the wagon-body, and it lies beneath the friction-roller E, which rides upon it, and thus the rear ends of the fifth-wheel device are upheld.

I claim as my invention—

1. The combination of the springs D D, converging toward their rear ends, having their front ends attached to the front axle and their rear portions united by a cross-bar F, which is connected to the bottom frame of the body by a king-bolt or other equivalent fifth-wheel device, a segment bar J, rigidly secured to and suspended from the bottom of said body, and a friction or roller bearing H E, secured to the terminal rear ends of said springs and adapted to ride upon the top surface of said segment-bar when turning the vehicle to either hand, substantially as set forth.

2. The combination of the front axle cylindrical near the wheels, the springs D D, converging toward their inner ends and having their outer ends bent to form eyes which surround said cylindrical parts of the axle, a cross-bar rigidly connected with said springs, a king-bolt connecting said cross-bar with the wagon-body, a plate rigid with said springs and connecting their inner ends and lying behind said cross-bar, a device, as J, secured to the wagon-body and supporting said plate, and shafts rigidly secured to the axle, substantially as and for the purpose specified.

3. The combination of an axle cylindrical near the wheels and having shoulders $a\,a$, the springs D D, converging toward their inner ends and having eyes formed in their outer ends which surround the cylindrical parts of the axle inside of said shoulders, a cross-bar rigidly connected with said springs, a king-bolt connecting said cross-bar and wagon-body, a plate connecting said springs behind said cross-bar, a roller mounted in said plate, and a segment-bar secured to the wagon and lying beneath the roller, substantially as and for the purpose specified.

JOHN J. BLACK.

Witnesses:
E. L. THURSTON,
FRANK MILLER.